United States Patent [19]
Good et al.

[11] 3,893,811
[45] July 8, 1975

[54] APPARATUS FOR PRODUCING POLYAMIDE ESTERS

[75] Inventors: Adrian J. Good; Thaddeus P. Kurek, both of Fort Wayne, Ind.

[73] Assignee: Valspar Corporation, Ft. Wayne, Ind.

[22] Filed: Apr. 18, 1973

[21] Appl. No.: 352,273

Related U.S. Application Data

[63] Continuation of Ser. No. 122,056, March 8, 1971, abandoned.

[52] U.S. Cl. .................. 23/285; 23/260; 23/290; 165/109; 259/102; 259/104; 260/78 R; 260/95 R
[51] Int. Cl. ..................................................... C08f 1/98
[58] Field of Search.......... 23/285, 260, 290, 252 R; 165/109; 259/102, 103, 104; 137/4, 92; 260/78 R, 95 A

[56] References Cited
UNITED STATES PATENTS

| | | | |
|---|---|---|---|
| 1,364,297 | 1/1921 | Nielsen | 259/104 UX |
| 2,665,197 | 1/1954 | Rowland | 260/95 A |
| 2,910,461 | 10/1959 | Nowlin et al. | 260/94.9 F |
| 2,989,517 | 6/1961 | Hanson et al. | 260/94.9 M UX |
| 3,242,641 | 3/1966 | Makin | 55/75 X |
| 3,258,313 | 6/1966 | Griffiths | 23/290 |
| 3,269,990 | 8/1966 | Wiloth et al. | 260/78 R |

*Primary Examiner*—James H. Tayman, Jr.

[57] ABSTRACT

This invention relates to an improved apparatus for producing polyamide esters at a given reaction location by providing a substantially anhydrous solvent, an aromatic tetracarboxylic dianhydride which is added in excess of its solubility rate within the organic solvent and immediately following is added a quantity of aromatic diamine to produce a polyamide ester precursor which has a greater solubility rate within the organic solvent than the dianhydride; an irreversible formation of aromatic anhydride precipitates is thereby prevented. The reaction mass is continuously monitored for viscosity and temperature, and the viscosity of the reaction mass approaches the order of 1,000,000 centipoises. After formation of the polyamide precursor ester, the precursor is then treated with additional aromatic diamine to form a polymer of controlled imidization, molecular weight and molecular distribution, which may thereafter be treated with ammonium hydroxide and other material to render the product water soluble and therefore storable and more advantageous to use.

4 Claims, 4 Drawing Figures

APPARATUS FOR PRODUCING POLYAMIDE ESTERS

This is a continuation filed under Rule 60 procedure of Ser. No. 122,056, filed Mar. 8, 1971, and now abandoned.

BACKGROUND OF THE INVENTION

This invention is related to a copending application directed to a process for producing polyamide esters. The present application describes and claims an apparatus for carrying out the process previously claimed under Application Ser. No. 122,050 filed Mar. 8, 1971 filed currently herewith and now abandoned, and assigned to the General Electric Company and the Valspar Corporation. The inventors are Good, Peterson and Kurek and the Title of the invention is "IMPROVED PROCESS FOR PRODUCING POLYAMIDE ESTERS."

In several previously filed co-pending applications, there are disclosed improved interrelated methods for making aromatic polyamic acid materials by synthesizing the polymer from precursor polymeric units which in turn are more easily formulated to provide a given molecular structure and composition. This is the gist of the teaching of application Ser. No. 822,899, filed May 8, 1969, entitled "PROCESS FOR PRODUCING WIRE COATING FROM PREPOLYMERIC MATERIALS" and invented by Marvin A. Peterson and now abandoned.

For a teaching relating to control of polymer viscosity, and solution of this type polymer, reference may be made to Application Ser. No. 803,037, filed Feb. 27, 1969, "IMPROVED PROCESS FOR PRODUCING COATING MATERIALS" and invented by Marvin A. Peterson, which teaches the combination of dianhydride and aromatic diamine which are reacted together within an organic solvent and stabilized by the additional of a volatile nitrogen containing base, such as ammonia or organic amine with the prepolymer partially imidized before full polymerization to control the viscosity of the solution. In copending application Ser. No. 822,899, the reactants are in the form of aromatic dianhydride (X) and aromatic diamine (Y) and are reacted together in anhydrous N-methyl-pyrrolidone (NMP) first in the molar ratio of 2/1 to form precursors (XXX) or (YXY), the precursors being then zipped up by adding either (Y) to the (XYX) solution or (X) to the (YXY) solution. A further refinement upon the synthesis technique shown in Ser. No. 822,899 is that indicated in a still further copending application Ser. No. 823,108, filed May 8, 1969 and now issued as U.S. Pat. No. 3,663,510, titled "IMPROVED PROCESS FOR PRODUCING POLYAMIDE COATING Materials." In Ser. No. 823,108, the precursor material, which is first formulated in the molar ratio of 2/1 parts of reactants is zipped up with a slight molar ratio excess of one or the other of the reactants and the resulting product is then back-titrated, approaching a 1/1 molar ratio of reactants. Any preselected desirable molecular weight range can be obtained by the back addition of either dianhydride to amine terminated prepolyimide polymer or by the back addition of aromatic diamine to dianhydride terminated prepolyimide polymer. The resulting product can be then endcapped in the manner illustrated in copending application Ser. No. 851,835, filed Aug. 21, 1969 and now issued as U.S. Pat. No. 3,652,500, titled "IMPROVED PROCESS FOR PRODUCING POLYAMIDE COATING MATERIALS BY ENDCAPPING" and invented by Marvin A. Peterson.

When adapting the foregoing teachings to large scale manufacture, we have found it advisable to carry out reactions within a jacketed vessel which serves as the reaction site for both the precursor formation and the finished polymer. In order to accomplish this, the reaction vessel is unique both in construction and function. For example, because the system is sensitive to the presence of water, the reaction may be carried out under a protective atmosphere and the reaction mass must be temperature and viscosity controlled to be effective in producing the desired product. Also, the preliminary treatment of the reactants and their combination, order and rate of addition are all found to be critical factors which are correlated in the present invention to produce a finished polyamide ester of proven purity and consistency, and which can be manufactured in large quantities.

The finished product has a narrow and consistent range of both molecular weight and viscosity and the process is subject to operator control within close limits. One of the difficulties in the manufacture of polyamide esters is how to achieve the necessary temperature control because if reaction temperature is not controlled (and these are all primarily exothermic reactions), imidization will occur to an untoward extent. Also if the reactants are not handled properly and in the manner taught by this invention, such products will precipitate before the chain of reaction is completed and the intermediate products prove difficult to dissolve in solvent, and may have to be discarded. These are the principal difficulties which have proved to be substantial and of long standing in the art; i.e., how to make in a continuous or semi-continuous manner on a large scale, a polyamide ester which is temperature sensitive and which must be controlled in viscosity, molecular weight and range of molecular weight. Moreover, it is essential that the process be employed with a view to economy, particularly with a view of conserving expensive solvents which are preferred in the manufacture of polyamide esters.

It has been found that the answer lies in the previously little understood and unexpected factors of: the order of introducing the reactants, the relative proportion of the reactants, the employment of a substantial range of viscosity of reactants, and the strict exclusion of water, both from the reactants and the reaction mass during the operation until a critical period of production. Moreover, it has been discovered that the reaction mass must be carefully and continuously monitored according to temperature and viscosity, and that if the temperature and viscosity are closely correlated with the addition of the reactants, it is possible to produce a finished product of consistency and highly controlled range of molecular weight, degree of imidization, range of viscosity, and it is possible to avoid the loss of reaction batches from time to time which inevitably occurs when the viscosity becomes excessive and the heats of reaction are not carefully controlled.

The present invention proposes a way of overcoming the foregoing described deficiency, and of setting into practice the teachings of the cited pending patent applications in a feasible large manufacturing scale.

OBJECTS OF THE INVENTION

The principal object of the present invention is to provide apparatus for a large scale manufacturing in producing polyamide esters of uniform quality and molecular weight.

A further object of the present invention is to provide an apparatus which produces polyamide esters on a large scale, and does so by continuously controlling both the temperature and viscosity of material and a novel agitating system, one portion of which is adapted for agitating the reaction mass when it is highly viscous and another agitating means when the reaction mass is less viscous.

A still further object of the present invention is to provide control means in the apparatus so as to carefully exclude water and the effect of water so that the finished polyamide ester is of a very precise molecular weight, this being made possible by first reducing the aromatic dianhydride to a solution form and in excess of its solubility rate within a suitable organic solvent, and immediately thereafter adding an organic diamine to produce a precursor which is more soluble within the organic solvent system.

Another important feature of the present invention is that in the apparatus for making the polyamide ester, the organic dianhydride and diamine are first added together to make a precursor and the reaction mass is then cooled by a suitable amount because the reaction is an exothermic reaction and may produce inadvertent temperature rises which affect the imidization rate. It is only after cooling the precursor reaction mass that additional organic diamine is added to convert the precursor material to the finished polyamide ester.

A further object of the present invention is to provide novel apparatus for producing polyamide esters in which all of the reactants are charged to a given reaction vessel, the reactions which take place there are all controlled according to temperature and viscosity in order that the imidization rate of the reaction product is carefully regulated and determined.

A further object of the invention is to provide a new and improved apparatus for producing polyamide esters from a wide variety of different organic dianhydride and organic diamine materials and to apply to each of them the techniques of this invention which is to rigorously exclude water, carefully regulate the temperature and pressure at a given reaction location, by continuously monitoring both temperature and pressure, and also to carefully regulate the amount and order of the addition of reactants. In this manner, we can consistently provide on a large scale manufacturing basis a polyamide ester of controlled purity and composition.

Other objects and features of the present invention will become apparent from a consideration of the following description which proceeds with reference to the accompanying drawings.

GENERAL DESCRIPTION OF THE INVENTION

The general reaction for producing a polyamide ester may be expressed as follows, wherein there is combined an aromatic dianhydride of the formula:

(1)

wherein R is a tetravalent radical containing at least 1 ring of 6 carbon atoms, and having a benzenoid unsaturation, the 4 carbonyl groups being attached to different adjacent carbon atoms with, an aromatic diamine having the formula:

(2)    $H_2N—R'—NH_2$ wherein R' is a divalent aromatic radical. The reaction product is a polyimide prepolymer composed of recurring units of the formula:

(3)

wherein the R and R' have the above-identified meanings and $n$ is an integer having an average value greater than 10 and the arrows indicate isomerism. In a typical polyimide prepolymer, there are approximately 2 carboxyl groups per repeating unit and the polymer has an apparent molecular weight in excess of 15,000 as determined by intrinsic viscosity measurements made in accordance with well known teachings.

Generally speaking, we employ two moles of aromatic dianhydride (X) with one mole of diamine (Y) to yield the precursor (XYX), which is more soluble in the organic solvent, this reaction being an exothermic reaction which must be carefully controlled in order to prevent undue imidization.

Initially, the aromatic dianhydride (X) is added to the organic solvent in an amount which is in excess of the solubility rate of the (X) in such solvent. In quick succession, the diamine (Y) is added before the (X) can precipitate as an unworkable cheese-like precipitate. The precursor material is formed immediately upon the addition of (Y) to the solvent which is supersaturated with (X), and the addition is done quickly enough so that the (X) will not precipitate as an unreactive, cheesy-like precipitate.

It is much easier to control imidization reaction by forming the precursor (XYX) than it would be to add the stoichiometric amount of (Y) to (X). The (Y) added is only one-half the stoichiometric amount so that the reaction of X + ½ Y can be cooled more easily within the reaction vessel. It is necessary to maintain the temperature as low as possible and within the range desired in order to reduce the occurrence of imidization. The [XYX] precursor material, after having cooled to a preferred temperature is then zipped up to form the complete polymer by adding (Y) reactant very slowly to (XYX) in substantially stoichiometric amounts while at the same time cooling, in order that the exothermic reaction will not excessively heat up the reaction mass and produce uncontrolled imidization.

Thereafter, the [XYXY] may be endcapped by adding a slight excess of (Y) in order that an anhydride group is not disposed as a terminal group, and the reaction mass is then treated with a suitable base such as ammonia or equivalent to make the product water soluble. Water then displaces some of the organic solvent which is considerably more expensive a solvent than water, and also makes the product indefinitely storable since it is immune to water as an objectionable contaminant.

Under the following headings which appear hereafter, there are separately considered the parameters of reactants, solvents, and the ammonia addition to make the product water soluble.

AROMATIC DIANHYDRIDE REACTANT

The aromatic dianhydrides that are useful in the process of this invention are those having the formula wherein R is a tetravalent radical containing at least one ring of 6 carbon atoms and having benzenoid unsaturation, each pair of carboxyl groups being attached to different adjacent carbom atoms. These dianhydrides include, for example, pyromellitic dianhydride, 2, 3, 6,7-napthalenetetracarboxylic dianhydride, 3,3'4-,4'-benezophenonetetracarboxylic dianhydride, benezene-1,2,3,4-tetracarboxylic dianhydride, bis (3,4-dicarboxyphenyl)sulfone dianhydride, bis (3,4-dicarboxyphenyl)methane dianhydride, bis (2,3-dicarboxyphenyl) methane dianhydride, 2,6-dichloronaphthalene-1,4,5,8-tetracarboxylic dianhydride, 2,7-dichloronaphthalene-,1,4,5,8-tetracarboxylic dianhydride, 2,3,6,7-tetrachloronaphthalene-1,4,5,8-tetracarboxylic dianhydride, naphthalene-1,2,4,5,-tetracarboxylic dianhydride, 3,3',4,4'-diphenyltetracarboxylic, dianhydride, 1,2,5,6-naphthalenetetracarboxylic dianhydride, 2,2',-3,3'-diphenyltetracarboxylic dianhydride, 2,2-bis (3,4-dicarboxyphenyl) propane dianhydride, 3,4,9,10-phenylenetetracarboxyl dianhydride, bis (3,4,-dicarboxyphenyl) ether dianhydride, 2,2,-bis (2,3 dicarboxyphenyl)propane dianhydride, 1,1-bis (2,3-dicarboxyphenyl) ethane dianhydride, 1,1-bis (3,4-dicarboxyphenyl)ethane dianhydride, and the like.

ORGANIC DIAMINE REACTANT

The organic diamines that are useful in the process of this invention are those having the formula:
$H_2N-R'-NH_2$ wherein R' is a divalent radical selected from the class consisting of:

wherein R''' and R'''' are an alkyl or an aryl group having 1 to 6 carbon atoms, $n$ is an integer of from 1 to 4 and $m$ has a value of 0.1 or more, and wherein R'' is selected from the group consisting of carbon in an alkylene chain having 1–3 carbon atoms, oxygen, silicon, phosphorous and sulfur in wherein R''' and R'''' are as above-defined and $x$ is an integer of at least 0.

Specific diamines which are suitable for use in the present invention are: meta-phenylene diamine, paraphenylene diamine, 4,4'-diamino-diphenyl propane, 4,4'-diamino-diphenyl methane, benzidine, 4,4'-diamino-diphenyl sulfide, 4,4'diamino-diphenyl sulfone, 3,3'-diamino-diphenyl sulfone, 4,4'-diaminodiphenyl ether, 2,6,-diamino-pyridine, bis-(4-aminophenyl)diethyl silane, bis (-4 amino-phenyl) phosphine oxide, bis-(4-amino-phenyl) -N-methylamine, 1,5-diamino naphthalene, 3,3,' -dimethyl-4,4'-diamino-biphenyl-3,3' dimethoxy benzidine, m-xylylene diamine, p-xylylene diamine, 1,3,-bis-delta-aminobutyltetramethyl disiloxane, 1-3-bis-gamma-aminopropyltetraphenyl disiloxane, and mixtures thereof.

SOLVENT ADDITION

The solvents useful in the solution phase of this invention are the organic solvents whose functional groups do not react with either of the reactants (the diamines or the dianhydrides) to any appreciable extent. Besides being inert to the system and preferably, being a solvent for the polyamide acid, the organic solvent must be a solvent for at least one of the reactants, and preferably for both of the reactants. The organic solvent is an organic liquid other than either reactant or homologs of the reactants, that is a solvent for at least one reactant, and contains functional groups, the functional groups being groups other than monofunctional primary and secondary amino groups and other than the dicarboxylanhydro groups. Such solvents include dimethylsulfoxide, N-methyl-2-pyrrolidone, the normally liquid organic solvents of the N, N-dimethyl acetamide, N-methylcaprolactam, etc. and tetramethylene urea, pyridine, dimethylsulfone, hexamethylphosphoramide, tetramethylenesulfone, formamide, n-methylformamide, butyrolactone, and N-acetyl-2-pyrrolidone. The solvents can be used alone, as mixtures or in combination with poor solvents such as benzene, toluene, cresylic acid, xylene, dioxane, cyclohexane, or benzonitrile.

and the aromatic diamine is 4–4' methylenedianiline (MDA) or (M) having the formula:

the reaction product of the two materials where there are two moles of BPDA for each mole of MDA expressed in the following:

AMMONIATING COMPOUNDS

The nitrogen containing bases that are useful in the process of this invention include ammonia ($NH_3$), ammonium hydroxide ($NH_4OH$), ammonium carbonate [$(NH_4)_2CO_3$], and primary and secondary aliphatic amines containing up to 4 carbon atoms such as methylamine, ethylamine, secondary butylamine, isopropylamine, dimethylamine, diethylamine, dibutylamine, etc.

The method of synthesis in each case is to produce the precursor from the aromatic dianhydride (X) and the aromatic diamine (Y) to form [XYX], it being understood that with these small prepolymeric units, imidization is not only more controllable to achieve the correct degree of control in the viscosity of the coating solution, but also we can form mixed polymers by adding other prepolymer units of different composition, as for example [X'YX'] or [Y'XY'9 or [XY'X] or [YX'Y] and blend these materials as required.

As a specific example of the invention, we use the aromatic dianhydride 3,3'; 4,4' benzophenonetetracarboxylic dianhydride (BPDA) or (B) having the formula:

and the partially imidized form of the polymer, as for example 50% imidization may be expressed in the following:

and the following represents the fully imidized form of the molecule

In any event, with any of the foregoing techniques, we have found that to obtain a maximum degree of flexibility, toughness, dieletric strength, concentricity, heat resistance, abrasion resistance and the like, we provide the ability to form high molecular weight polyimide enamels within a narrow range of molecular weights and those results are achieved by slowly adding (M) to [BMB] precursor polymeric materials or adding [B] to [MBM] solution with the reactions being represented by:

(1)  nBMB + nM → [BMBM]$_n$
(2)  nMBM + nB → [MBMB]$_n$

PROCESS OF PRODUCING POLYAMIDE ESTERS AND APPARATUS

Figure 1:
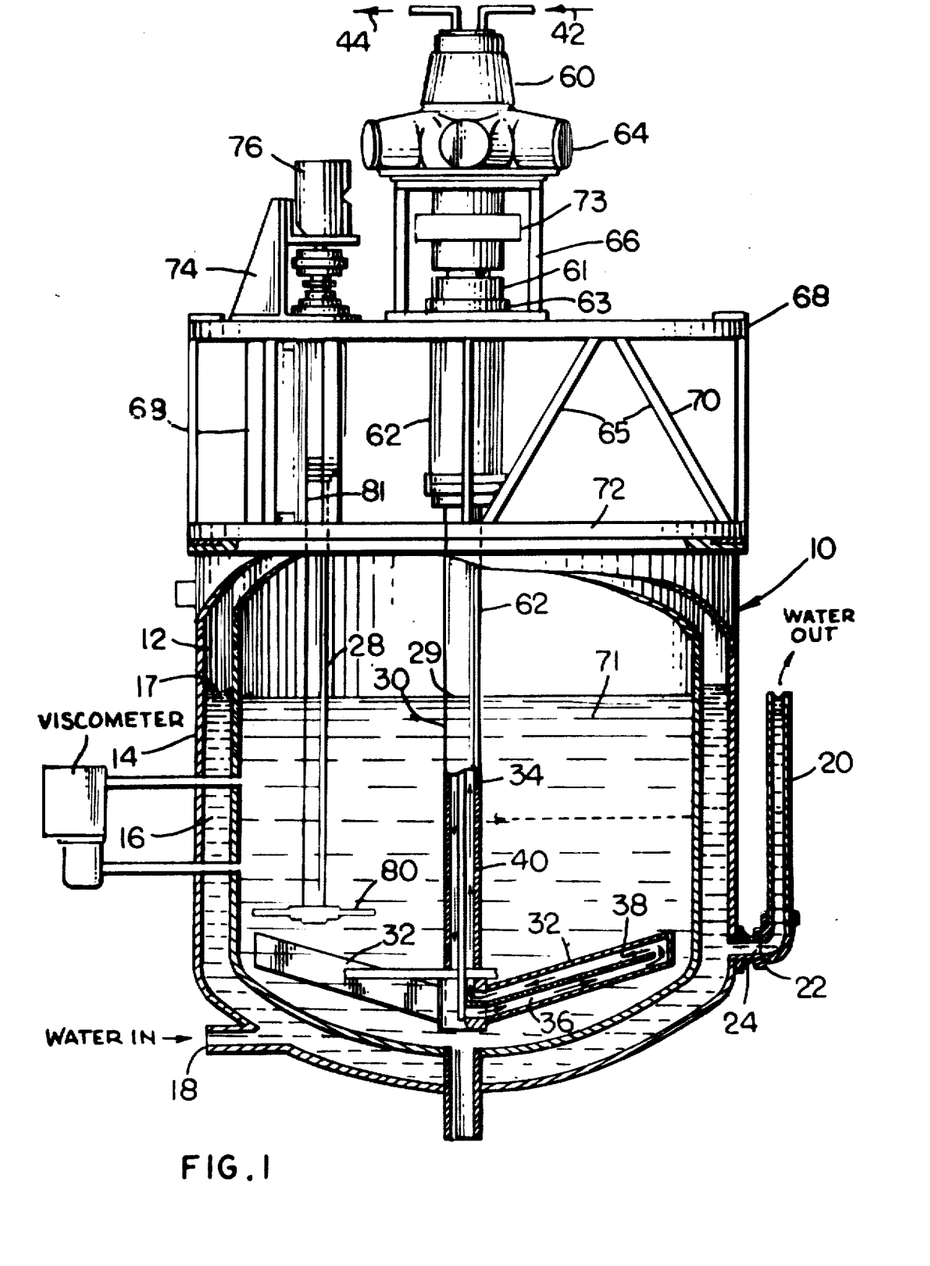
FIG. 1 is an enlarged detail view of the reaction vessel which is used for carrying out the polyamide ester reaction.

Referring now to the drawings, a reaction vessel designated by reference numeral 10 is jacketed and contains an inner vessel 12 and a spaced outer wall 14 with a space 16 for coolant 17 therebetween which consists of circulating water starting from an inlet 18 and a movable outlet arm 20 which provides an outlet for the cooling water. The arm 20 is pivoted at 22 on a seal joint 24 with the angular position of 20 determining the height of the coolant within the jacket or annular space 16 between vessel 12 and 14. The purpose of having a variable height is that we prefer to limit the height of the coolant within the jacket to be at all times at the same height as the reaction mass within the vessel. Within the vessel are two agitators, 28 and 30, the agitator 30 being especially adapted for high viscosity mixing and the agitator 28 being for low viscosity mixing and adapted to operate at substantially greater speed.

Agitator 30 includes a stainless steel shaft 29 having four spaced blades 32 located at 90° intervals. Internally of the shaft 29 is a central cooling passage 34 through which cooling fluid is injected into the agitator and connecting with passages 36 extending the length of the respective blade 32, at the end of which the flow is reversed and passes into return passage 38 and then to annular passage 40, also internally of the shaft. Referring to the upper portion of FIG. 1, arrow 42 designates the inflow of cooling water and arrow 44 the outflow. In this manner, continuous circulation of cooling fluid is provided and circulated through the internal portion of the reaction vessel by means of the agitator 30 to closely control the temperature of the reaction mass. The flow rate and temperature of the coolant is in accordance with the temperature maintained in the reaction mass.

A rotary seal (not shown) is provided between the stationary portion 60 and rotatable portion 62, and the shaft 29, is supported on tapered roller bearings 61 of a support 63.

The rotatable portion 62 is driven by a high speed hydraulic motor 64 nominally rated at about 40 h.p. and driven at 0–25 rpm with 7350 feet - pounds of torque. The motor is mounted through pedestal 66 on upper frame 68 having cross beam reinenforcement 70 which connects with cover plate 72. A coupling 73 connects motor 64 and shaft 29 through bearings 61 in bearing support 63. The cover plate 72 can be swung between open and closed position to provide for cleaning of the internal portion of the vessel.

The agitator is capable of being turned through viscosities of up to 2,000,000 centipoises and cooling is continuously effected directly upon the reaction mass through the agitator blades 32 which are immersed within the reaction mass which is also cooled around the outer surface of the vessel by the water coolant, in jacket 16.

The second agitator 28, which is a high speed agitator is mounted on the frame 68, and is supported by a gusset plate 74. A hydraulic motor 76 nominally rated at 40 h.p. produces speeds from zero to 1400 rpm and 1700 inch-pounds torque. Propeller shaft 28 has a disc-like 14 inch propeller agitator 80 which is located below the surface of the reaction mass 71 and is adapted to rotate at substantial speeds when the viscosity of the reaction mass is reduced. The agitator is supported and is elevatable by a lift cylinder 81 which raises and lowers the agitator within the reaction mass.

Figure 2:
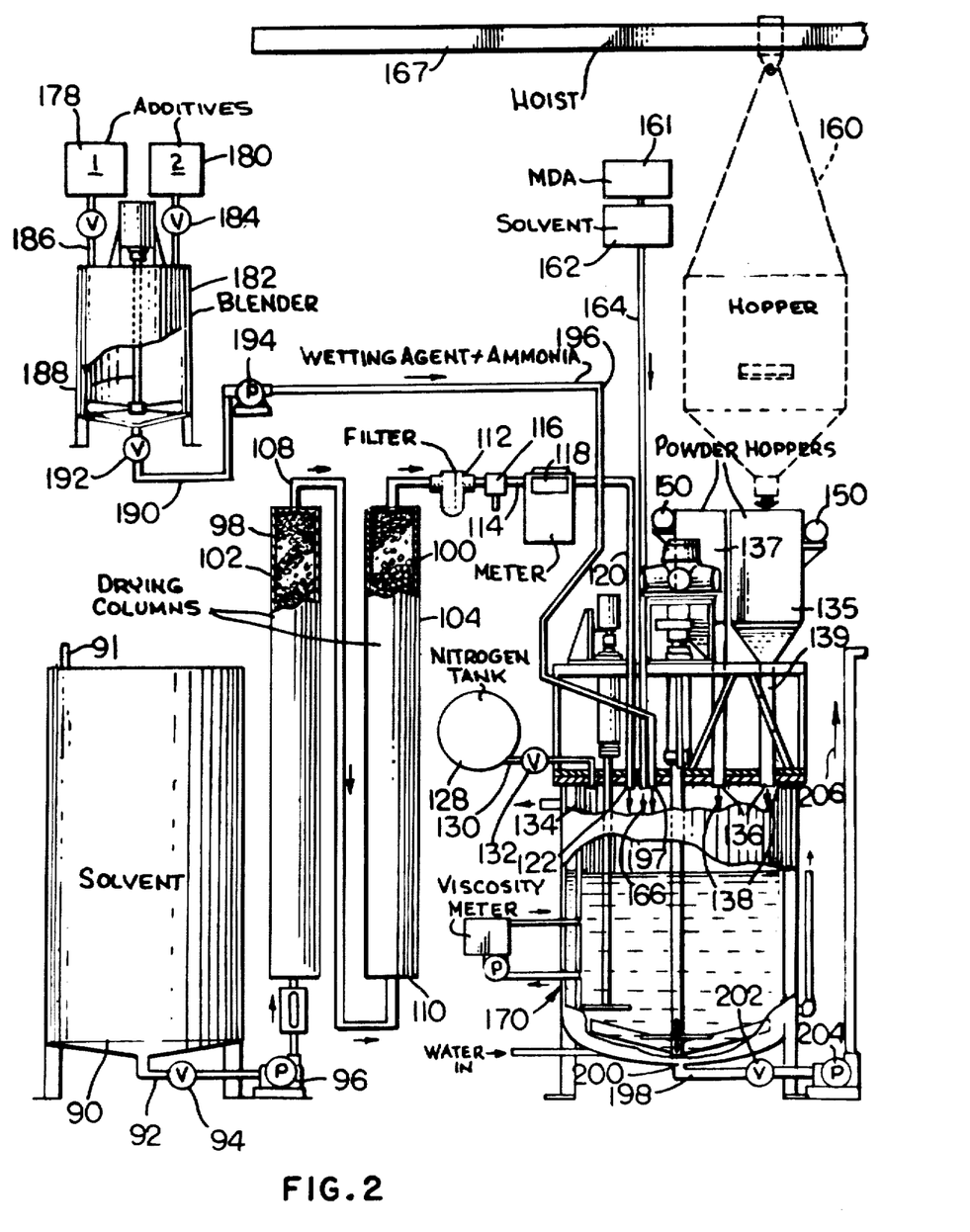
FIGS. 2 and 3 together make up the entire material handling system and apparatus for preparing the reactants and supplying them to the reaction vessel, 2 being the reaction vessel portion of the system, and 3 representing the flow of reaction product after it leaves the reaction vessel, and is further blended to the desired storable quantity of solvent and product at the desired viscosity, molecular weight distribution and composition; and, FIG. 4 is a flow diagram illustrating the process for producing the polyamide ester, including the order of addition of reactants, the preliminary treatment of such reactants and identification of the reactants in accordance with this invention.
Figure 3:
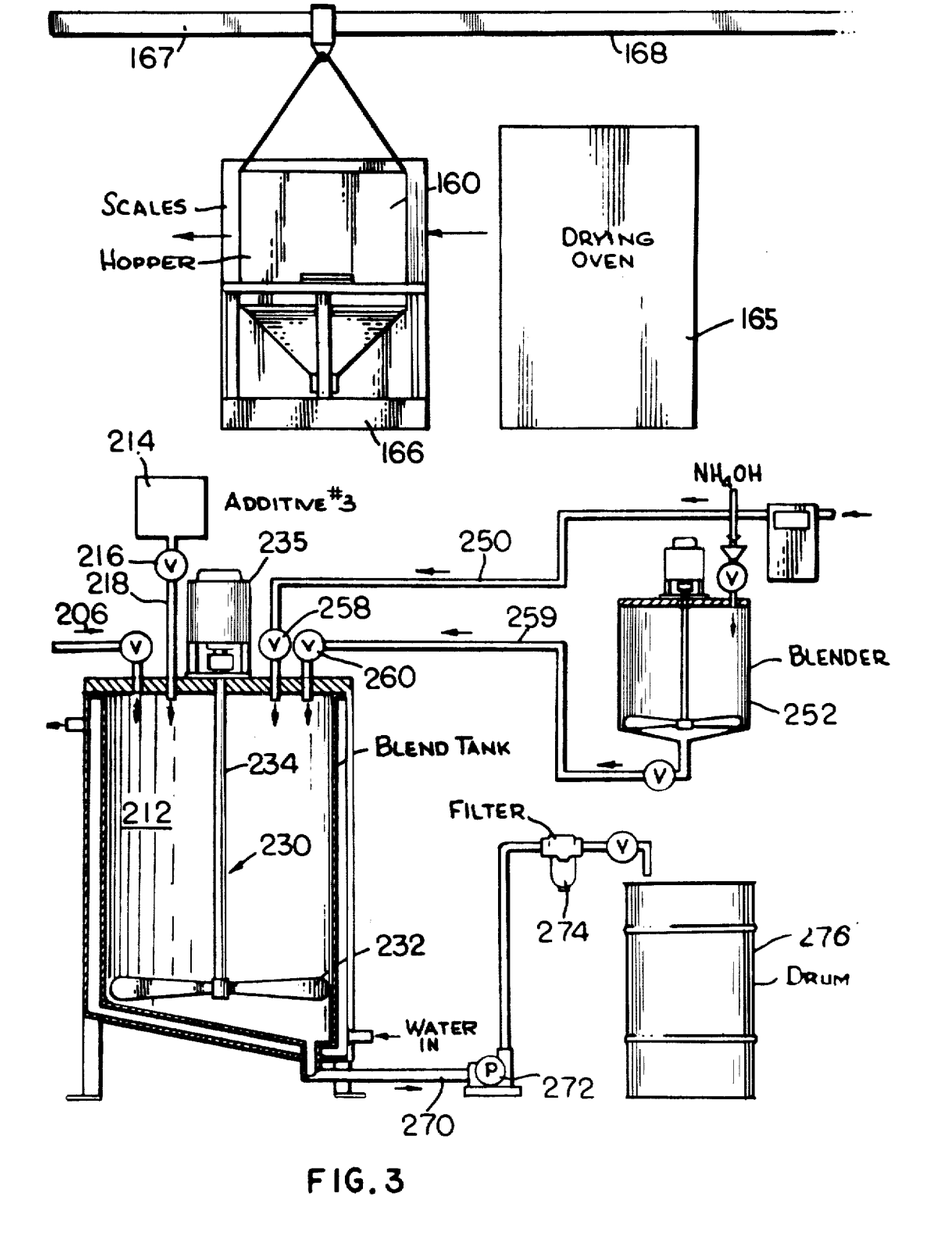

Referring next to FIGS. 2 and 3, the solvent is contained within a storage vessel 90 charged through an inlet 91 and withdrawn through an outlet line 92 controlled by a valve 94. A pump 96 passes the solvent through molecular sieve particles of synthetic zeolite having a pore diameter of 3 Angstrom and designated generally by reference numerals 98 and 100 within columns 102 and 104 respectively. The upper end of the column 102 is connected by the line 108 to the lower end 110 of column 104. After passing through the molecular sieve, to remove substantially all of the water content of the solvent (having a residual 100–20 ppm), the solvent is next passes through a filter 112 in line 114 having a sample tap 116 and through a meter 118 to line 120 where is discharges at 122 into the reaction vessel.

The solvent, which may consist for example of N-methyl-2-pyrrolidone (NMP) after having passed through the 3 Angstrom molecular sieve bed 98, 100, is virtually water free and contamination free. The vessel is charged with an artificial atmosphere consisting of pure dry nitrogen. The nitrogen is supplied from a tank 128 through line 130 controlled by valve 132 and having an inlet 134 to the interior of the vessel. The air, including moisture, is replaced by nitrogen which is essentially water-free and, because the moisture is completely excluded, this precludes polymer chain stopping from that source of contamination.

The aromatic dianhydride and diamine are provided from one or the other of two vibrating powder hoppers 135 and 137, each having a discharge line 139 opening at 136 as indicated by arrows 138. Each of the hoppers 135,137 contains a motor vibrator 150 to keep the powder settled at the bottom of the discharge hopper and to insure a complete discharge thereof. The powders are supplied from a movable hopper 160 (FIG. 2,3) the dianhydride powders having been first thoroughly dried in a heating oven indicated by reference numeral 165 and then weighed on the scale 168 to insure the correct amount in the movable hopper 160 which is mounted on an overhead rail 167 to facilitate transport to the reaction vessel.

The dry powder resin material, when consisting of benzophenonetetracarboxylic dianhydride (BPDA), is heated and washed with acetone. As furnished the (BPDA) has approximately 2.5 % impurities principally as benzophenonetetracarboxylic acid. The acid is removed by washing the acetone and then heating for approximately one hour at 200° C. The acetone rinse may in some cases be omitted, and lower heating temperatures than 200° C are also usable, but for equivalently longer periods.

The sequence of adding the reactants is important to the invention. The reaction vessel is first charged with a suitable quantity of solvent and the (BPDA) is then added up to 33% by weight of the solvent. Since the extent of solubility of the (BPDA) within the solvent is only approximately 17–20%, the excess (BPDA) appears as a fine slurry within the supersaturated NMP solvent. The slurry has a substantial viscosity that rises to approximately 1,000 centipoise viscosity. During this solubilizing stage for the (BPDA), the exothermic reaction must be carefully controlled to avoid imidization of the (BPDA).

Thus, the jacketed vessel 10 is cooled by a continuous flow of water through the annular jacket 16 and also through the impellers 32 which are continuously rotated within the reaction mass to effect uniform cooling throughout the reaction mass and to obtain a uniform distribution of molecular weight. If localized overheating did occur, there would be a non-uniform reaction product. The supersaturated NMP will quickly produce a precipitate of the (BPDA) which will form a complex ion with itself and develop into a cheese-like precipitate which must be discarded Therefore, shortly after the (BPDA) addition there is added to the reaction mass a quantity of the aromatic diamine to form the precursor [BMB] or [MBM]. In the case of methylene dianiline (MDA or M) there is added to the supersaturated solvent contained in the vessel 50% molar quantity of (M) to produce the precursor [BMB]. The precursor formation reaction is also an exothermic reaction and cooling is continued both through the jacket and impellers; however, the [BMB] precursor is much more soluble within the NMP solvent system and therefore the viscosity quickly reduces from about one million centipose to a viscosity substantially equal to that of water. The (M) may contain several percent of aniline, but this is avoided by fractional distillation so that the (MDA) is approximately 99.5% pure. The (MDA) is added from storage 161 together with any suitable quantity of solvent obtained from 162 and both are then transferred through line 164 and outlet 166 into the reaction vessel 10. Because of the limited time within which the diamine (MDA) can be added before the aromatic dianhydride (BPDA) precipitates to an uncontrolled condition, the subsequent addition of the diamine follows shortly upon the formation of supersaturated (NMP-BPDA) mixture. When the (MDA) is added promptly as prescribed, each mole of (MDA) will react with two moles of (BPDA) so that the undissolved (BPDA) quickly goes into solution before it further complexes and precipitates; and, the (BPDA) in solution is combined with the (MDA) to form a highly soluble [BMB] precursor molecule. Thus, the order and rate of addition of the reactants is of critical importance. Also, since each of the described reactions is exothermic, care must be taken to quickly remove the heat of reaction in order that the temperature of the reaction mass does not rise to the point where imidization will occur.

After the formation of the precursor [BMB], the precursor [BMB] is zipped up to form the finished polymer by adding the remainder of the (M) at a much slower rate in order to better control the exothermic reaction which occurs both by reason of adding the (M) to the solvent and also because of the exothermic reaction which occurs by zipping up the presursor polymer:

n[BMB] + nM → [BMBM]n.

Figure 4:
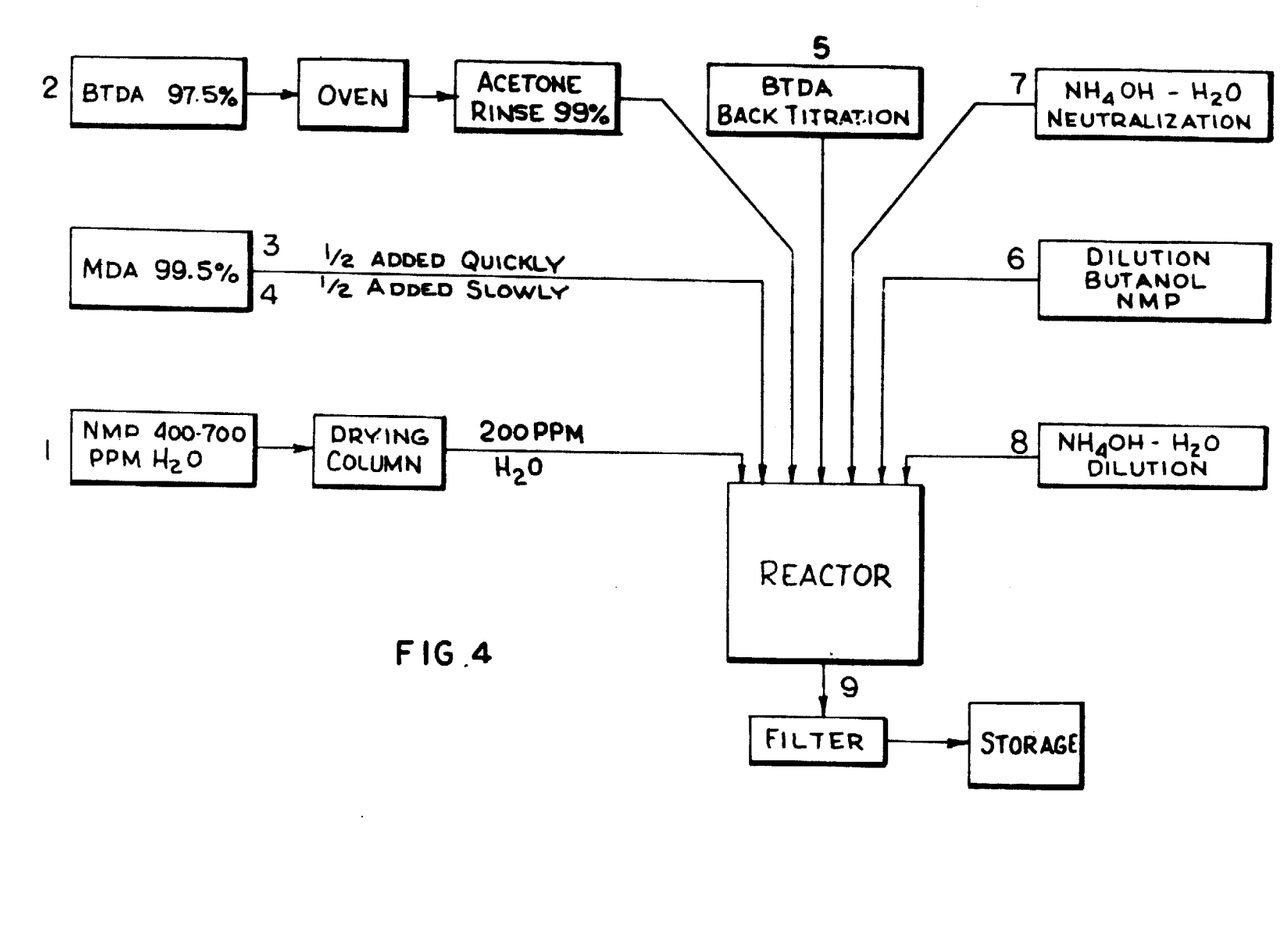

That is why the precursor formation and zipping up are indicated separately in FIG. 4. In the flow sheet (FIG. 4) the exotherm is controlled by the combination jacketing and cooling of the impeller to dissipate the temperature which is produced. In any event, the temperature rise will not be above the temperature of imidization. Also it is the practice, after the final polymerization reaction, to endcap the product. By adding a slight excess of M there is assured a terminal amine group, and the reaction generally may be expressed as the following:

n BMB + n M → [BMB M]$_n$
and,
[BMBM]$_n$ + M → M [BMBM]$_n$
which may be represented by the formula:

By so endcapping the product to achieve a more stable material the formulator has greater control of viscosity and molecular weight.

The endcapping can occur either in the reaction vessel 10 or vessel 212 whichever is preferred.

As described, the process occurs semi-continuously, that is, a batch of the reactant is made and the reaction vessel can discharge to be followed immediately upon recharging and resynthesis of additional batches of material.

The interval between forming the slurry BPDA in NMP, and the additional MDA is only a matter of a few minutes, and during this period as well as all other portions of the production of the polyamide ester, a portion of the reaction mass is diverted and continuously monitored and evaluated for its viscosity. Such continuous withdrawal, testing and return of the tested diverted portions through a viscometer is indicated by reference numeral 170 (FIGS. 2,3). Because of the expensive nature of the NMP as a solvent, it is desirable to use co-solvents and diluents such as dimethylformamide (DMF) dimethylacetamide (DMAC) and aromatic solvents such as xylene and higher boiling homologs.

We have also found it feasible to replace some of the NMP with water as a solvent. This occurs by first forming ammonium polyorthoamate by the addition of ammonium hydroxide or by suitably reacting the carboxylic sites with another nitrogen base in accordance with the following general reaction:

wherein R and R' are as prior-defined and y is an integer in excess of 10, for example, from 10 to 10,000 or more, and wherein from 65 to 100% of the total number of the [COOH] groups are in the form of the ammonium salt.

The co-diluents, ammonia or other base material derived from supply container 178 and 180 are added to a blending vessel 182 through valve controlled lines 184, 186, and are thoroughly mixed by agitator 188. The combination is then supplied through line 190 controlled by valve 192 and pump 194 through inlet line 196 and outlet opening 197 to the reaction vessel 10.

The line 190 may also serve as an inlet for such additives as an adduct of nonyl phenyl ethylene oxide which serves as a surfactant.

Generally speaking, the ammonium hydroxide is added in a controlled amount which is slightly less than the stoichiometric amount that makes the polymer completely water soluble and stops all further reactions between the BPDA and MDA. The resulting product is stable on storage and, being a water soluble material, has lower flammability, less adverse effects on contact with persons who are susceptible to dermatitis, the incidence of air pollution is reduced from fumes, and thereafter any equipment which is used with the resulting material is water cleanable.

The mixing of reactants occurs at high speed; first low viscosity high speed mixer 28, then high viscosity low speed mixer 30 having the impeller 32. After the product is produced, it is removed through discharge line 198 and outlet port 200, controlled by valve 202. A pump 204 positively displaces the reaction product indicated by the arrow 206 (FIG. 2) and it discharges into a vessel 212 where further additives may be added from storage 214 having a control valve outlet 216 and supply line 218 connecting with the vessel 212. Further mixing can occur within the vessel by an agitator 230, having an impeller 232 on a prop shaft 234 and which is powered by an electric motor or the like 235. Additional ammonium hydroxide can be added through line 250, either separately or with other additives obtained from a blender 252, and supplied through line 254, the two lines 250, 259, being controlled by valves 258 and 260 respectively. The blending of ammonium hydroxide with additional water, organic solvents or a mixture of water and organic solvents with the ammonium hydroxide. After the blending occurs within the blend vessel 212, the resulting product is discharged through line 270 under the action of a pump 272, past filter 274 and into storage containers 276.

SPECIFIC EXAMPLES

EXAMPLE 1

20,250g of NMP was passed through a 3A molecular sieve and put in the reactor which was previously cleaned, rinsed with acetone, and purged with dry nitrogen. Agitation was started and to this 6,246 g of (BPDA) which had been purified by washing with acetone and heating for 2 hours at 190° C was added rapidly. To this was immediately added 735 g of redistilled (MDA), then 1200 g of redistilled (MDA) over a 3 minute period. The reactor was kept well purged with dry nitrogen and closed immediately after additions. Immediately on addition of the (MDA), water was run through the cooling jacket five minutes after starting, from 75°F, the reaction mass had reached its peak temperature of 122°F. After 12 minutes the reaction mass had cooled to 100° F. 1878 g of (MDA) was then added over the next 20 minutes, at which time the indicated temperature was 110°F. following this the rate of agitation was lessened for two hours and was shut off for 16 hours. At this time the high speed agitator was run again, bringing the temperature to 43° C, at which time a sample was taken which had an absolute viscosity of 17,000 poise at 43°C, and an inherent viscosity of 0.86 in NMP at 0.5 g/deciliter at 37.7°C.

A mixture of 5500g NMP and 8000g butanol was then added and mixed until homogeneous. Then a mixture of 1400g of 28% ammonium hydroxide in 4500g of distilled water was added, then a mixture of 157g ammonium hydroxide in 13,600g water, then a solution of wetting agent in 1000g NMP.

When coated on aluminum or copper wire, baked at 300°C for an appropriate time, this polymer produced a coating which showed no failures in transformers tested for 1280 hours at 325°C and 300°C.

EXAMPLE 2

20,250g of NMP was passed through 3A molecular sieve and put in a clean dried and purged reactor as above. 6246g of (BPDA) was added which had been purified by heating at 190°C for 2 hours only. The same amounts of (MDA), 735g, 1200g, and 1878g were added as in Example 1. After 2½ hours the absolute viscosity was:

1120 poise 65°C
1720 poise 54°C
2250 poise 47°C
3200 poise 42°C
6000 poise 30°C and the inherent viscosity was 0.57 at 37.7°C and 0.5g deciliter. 20g of (BPDA) dissolved in 200g NMP was then added, at which time the absolute viscosity rose instantaneously to 4200 poise 57° and the inherent viscosity to 0.76 at 37.7° at 0.5g/deciliter. Solvents were added as in Example 1.

EXAMPLE 3

20,250g NMP, 6246g (BPDA), 735,1200, and 1878 MDA were treated and added as in Example 1. After one hour the absolute viscosity was:

2600 poise at 66.5°
3700 poise at 57°
7000 poise at 47°
12,300 poise at 36°
18,200 poise at 31° and the inherent viscosity was at 0.86 at 37.7°C, with 0.5g/deciliter NMP. A solution of 20g (BPDA) in 1000g NMP was added and agitated for another hour, at which time the absolute viscosity was:

6500 poise at 54°
8800 poise at 49°
10800 poise at 44°C
19000 poise at 32°C.

The inherent viscosity was 0.91 measured as above. 34.608g NMP plus surfactant was added as diluent or let-down solvent.

The foregoing examples are to be construed as illustrations and not as limitations of the present invention.

It is reasonably to be expected that those skilled in this art can make numerous adaptations and revisions of the invention and it is intended that such revisions and adaptions will be included within the scope of the following claims as equivalents of the invention,

We claim:

1. Apparatus for producing a polyamide resin from an aromatic dianhydride and an aromatic diamine compising a reaction vessel for receiving an essentially anhydrous organic solvent having functional groups which are non-reactive with the polymer-forming reactants and a solvent for at least said aromatic dianhydride, means for supplying under anhydrous conditions and carefully controlled temperatures an aromatic dianhydride with said solvent to form a high viscosity slurry by combining an amount of such dianhydride in said solvent which is in excess of the dianhydride solubility limits within said solvent; means for charging to said vessel a quantity of aromatic diamine in close succession to the formation of said slurry before said slurry precipitates into an insoluble mass and thereby converting the aromatic dianhydride and aromatic diamine to a precursor having a greater solubility in said solvent sand and of molar proportions consisting of two parts of one of said reactants to one part of the other of said reactants whereby a reaction mass is formed within said vessel, means for cooling said reaction mass within said vessel as determined by the viscosity of said reaction mass so produced to closely control the reactions occurring in said solvent; means for controlling the viscosity of the reaction mass by controlling the temperature of such mass and including means forming a part of said vessel for regulating the order and concentration of dianhydride and diamine additions to said vessel; means for withdrawing a portion of the reaction mass within said vessel and returning said portion after testing the viscosity thereof, a high speed first agitating means disposed within said vessel for stirring at a relatively high speed the low viscosity mixture of aromatic dianhydride and solvent, a lower speed second agitating means also within said vessel for stirring the mixture of aromatic dianhydride, aromatic diamine and solvent as said initial mixture is converted to a precursor of substantially greater viscosity; means for heating the aromatic dianhydride prior to its introduction into said reaction vessel whereby said dianhydride is rendered substantially water free; means for rendering the organic solvent substantially anhydrous by passing such solvent through a molecular sieve connected between said supply and vessel whereby said molecular sieve renders the solvent substantially anhydrous and means for withdrawing the product from within said vessel at the termination of reaction conditions.

2. The apparatus in accordance with claim 1 wherein said cooling occurs within said low speed second agitating means.

3. Apparatus for producing polyamide resins from aromatic tetracarboxylic acid and aromatic diamine reactants comprising: an enclosed chamber, means operatively connected to said chamber for providing an anhydrous supersaturated organic solvent solution of said aromatic tetracarboxylic acid; means associated with said chamber for regulating the order and concentration of aromatic tetracarboxylic acid and aromatic diamine reactants within said enclosed chamber in the molar ratio of 2/1 to form a precursor; means associated with said chamber for substantially continuously controlling the temperature of the reactants to regulate the imidization rate of said reactants, in the formation of a precursor from said reactants, high speed first means within said chamber for agitating said reaction mass at a viscosity of about 1,000 centipoises, and low speed second agitating means for agitating said reaction mass at about 4,000,000 centipoises, supply means for adding additional reactant to said vessel at sufficiently low rate to suppress the rate of imidization and effect coupling of said precursors to a preferred molecular weight polymeric unit; outlet means for continuously removing and testing the reaction product viscosity to determine the extent of polymerization of said reactants, and supply means to said vessel for continuously supplying essentially anhydrous reactants to said apparatus.

4. The apparatus in accordance with claim 3, including means for supplying a quantity of ammonia to render said reaction product water soluble; and means for diluting the water soluble mass with water and thereby replacing, at least partially, the organic solvent.

* * * * *